Figure 1B:
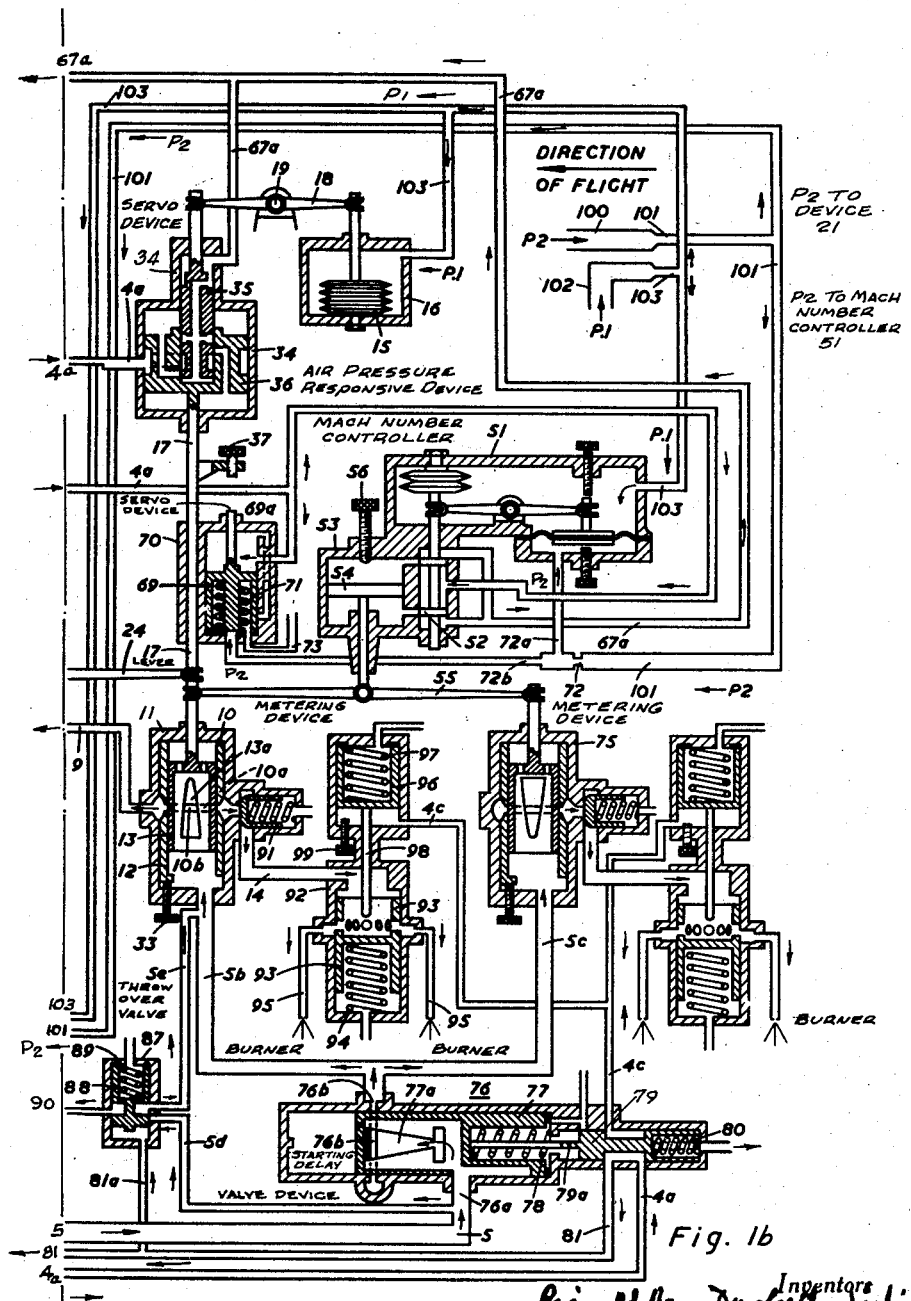

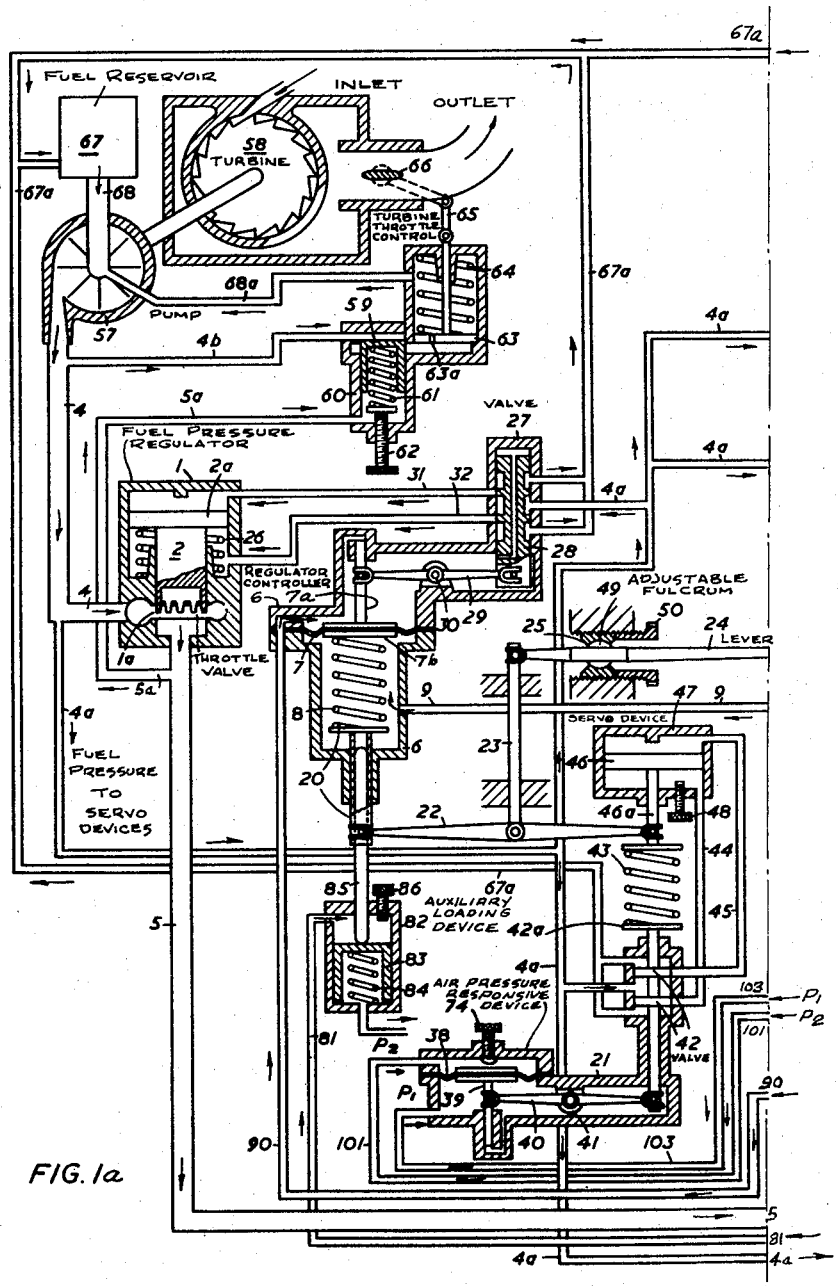

United States Patent Office 2,871,659
Patented Feb. 3, 1959

2,871,659

FLIGHT-SPEED RESPONSIVE FUEL CONTROL SYSTEM FOR JET PROPULSION POWER PLANT

Reginald Henry Douglas Chamberlin, Ealing, London, Dennis Hainsworth Mallinson, Fleet, and Rhys Price Probert, Frimley Green, Aldershot, England; said Chamberlin assignor to D. Napier & Son Limited, London, England, a company of Great Britain; said Mallinson and said Probert assignors to Power Jets (Research and Development) Limited, London, England, a British company Application January 14, 1952, Serial No. 266,262

Claims priority, application Great Britain January 17, 1951

14 Claims. (Cl. 60—39.28)

This invention relates to the control of a combustion system in a thermal power plant and consists broadly in a particular mode of controlling the supply of liquid fuel in accordance with two or more gas or air pressures upon which the operation of the plant must depend. Thus the invention as applied to jet propulsion plant for aircraft consists in means for controlling the fuel supply, during flight, in joint dependence on a pressure dependent on altitude, i. e. the static ambient atmospheric pressure—and a pressure dependent on the speed of flight—e. g. the Rayleigh-Pitot pressure. The term "aircraft" is used broadly to mean any device that can fly and carries its own propulsion plant. The invention is however particularly applicable to a ram jet equipment—i. e. equipment in which the propulsive jet of combustion products for maintaining flight of a device after launching is generated by burning fuel in compressed air supplied by the motion of the device itself through the atmosphere.

According to the invention furthermore the fuel supply, after the plant has started up, is varied according to a law of the form $Af(P_1)\sqrt{P_2-CP_1}$ wherein $P_1$ is the static ambient pressure, $P_2$ is the other pressure, $f(P_1)$ is some desired function of $P_1$ and A and C are constants.

Another feature of the invention makes use of the fact that the rate of flow of liquid through an orifice is proportional to the effective area of the orifice and to the square root of the drop of pressure across the orifice. According to this feature the area of the fuel metering orifice is varied in accordance with $P_1$ and the pressure of the liquid fuel supplied to the fuel metering orifice is so controlled that the pressure drop across the orifice is proportional to $(P_2-CP_1)$. According to yet another feature the pressure of the fuel supplied to the orifice is controlled by means responsive to any out-of-balance of a device acted upon differentially by this pressure on the one hand and by the pressure of the liquid emerging from the orifice and a variable biassing force on the other hand. The difference between the two pressures will thus be automatically maintained at a value proportional to the biassing force, which may be varied in accordance with $(P_2-CP_1)$.

When the device is launched as a projectile or takes off under any power other than that of the normal propulsive power plant, which plant starts up during flight—as is essential for example in ram jet equipment—an important feature of the invention consists in means for overriding the normal fuel supply control during initial flight to produce desired conditions for starting-up the plant. In the case of a ram jet, ignition of the main fuel burners from an igniter or from previously ignited auxiliary burners would take place at a speed determined by how the fuel supply depends on altitude and speed of flight; the overriding control means extends the lower part of the range of speeds over which the fuel-air ratio will be such that the fuel-air mixture will ignite and maintain combustion, whereby ignition occurs at a speed of flight corresponding to a low Mach number.

As the pressure $P_2$ dependent on speed of flight will be initially ambient static pressure (i. e. at zero speed) the normal control means according to the invention will supply no fuel to the burners at first, and not until the speed is such that $P_2$ has a certain value greater than $CP_1$, the value of C being less than one. To ensure that there can be a fuel supply before this particular value is reached the overriding control apparatus acts temporarily to alter the biassing force on the differential pressure device and to impose a different control characteristic on the fuel supply. A preferred form of overriding control apparatus consists firstly of a further metering orifice in series with the supply to the normal metering orifice and variable in response to the building-up of fuel pressure, and means for initially and temporarily increasing the variable biassing force on the differential pressure device to a constant minimum so as to cause opening of the pressure regulator throttle and to maintain a steady pressure drop across the two orifices in series.

One particular equipment according to the invention is shown in the accompanying drawings Figs. 1a and 1b which should be read together and with parts broken off and numbered on the dot-dash line at the right-hand side of Fig. 1a joined to the corresponding parts broken off and numbered on the dot-dash line at the left-hand side of Fig. 1b. To assist in an understanding of the invention a simplified and more diagrammatic representation of certain essential features of this equipment are shown in Fig. 2.

Figure 2:
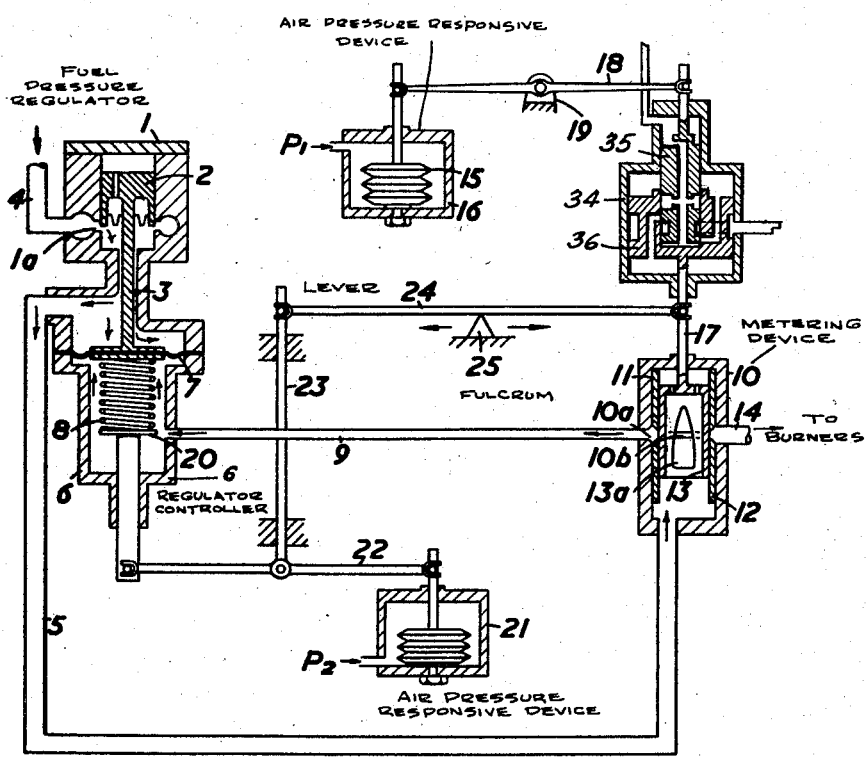

Referring first of all to Fig. 2 the liquid fuel supply from a pump, as hereinafter set forth, flows from pipe 4 through a pressure regulator 1 and thence by pipe 5 to a metering device 10 with a variable orifice 10b and so by pipe 14 to the fuel burner or burners.

The pressure regulator 1 consists of a variable throttle valve member 2 movable to progressively cover and uncover ports 1a through which fuel from pipe 4 can enter a cylinder within the regulator 1; this throttle is actuated in accordance with the pressure drop across the said orifice so that on any variation of this drop from a desired value, the pressure of the fuel admitted to the pressure regulator and thence flowing through pipe 5 to the metering device is altered in a corrective sense.

Associated with regulator 1 is a regulator controller 6 having a diaphragm 7 which, in normal operation, is loaded on one side by the fuel which goes to the upstream side of the said orifice in the metering device 10 and on the other side, firstly by fuel coming through pipe 9 from the downstream side of the said orifice, and secondly by a loading spring 8 variably compressed as hereinafter described. The diaphragm 7 is thus in equilibrium only when the pressure difference across the said variable orifice 10b is at a value determined by the force of the biassing spring 8. The diaphragm 7 is shown diagrammatically in Fig. 2 as acting on the pressure regulator directly through a connecting stem 3, but actually as explained later with reference to Figs. 1a and 1b it acts through a servo device.

The metering device 10 includes within its casing the members 11 and 12 separated by a gap 10a forming an aperture across the casing and an orifice member 13 having a tapered opening 13a and slidable along the casing over the aperture between the members 11 and 12. Thus the metering orifice 10b is defined by the intersecting openings 10a and 13a. The slidable orifice member 13 is moved by a pressure responsive device containing in casing 16 an evacuated sealed capsule 15 in casing 16, which is subjected externally to the pressure $P_1$. The pressure-responsive device 16 is connected to move orifice member 13 through a servo device 34, the capsule 15 being connected to one end of a lever 18 pivoted at 19, and the other end of the lever being connected to a piston valve 35 slidable partly in the cylinder body of the servo device 34 and partly in the servo piston 36 which is directly connected to the stem 17 of the orifice member 13. By suitable choice of the varying widths of the tapered opening 13a in the orifice member 13 and the extent of the aperture 10a across the casing of the metering device 10, the area of orifice 10b can clearly be made to vary according to a desired function $f(P_1)$. The rate of flow through the metering orifice 10b will of course be proportional to the area of this orifice and to the square root of the pressure difference $p$ maintained automatically across the orifice; the rate of flow of fuel will then be according to law $Af(P_1)\sqrt{p}$.

In order that $p$ shall be proportional to $(P_2 - CP_1)$ the biasing spring 8 in the regulator controller 6 bears against an abutment 20 movable to vary the spring force in accordance with this difference. For this purpose the pressure responsive device 16 responsive to pressure $P_1$ can act on the movable abutment 20 differentially with a pressure responsive device 21 responsive to the pressure $P_2$. The device 21 is shown diagrammatically in Fig. 3 as being of the same type as the device 16 and as acting directly on one end of a lever 22 turning about an intermediate pivot and having its other end connected to move the abutment 20. The exact type of pressure responsive device 21 which is preferred, will be described in more detail with reference to Figs. 1a and 1b. The intermediate pivotal point of lever 22 is carried by the slider 23 which can be moved by one end of lever 24; the latter lever is mounted on a fulcrum 25 (shown diagrammatically in Fig. 3) which is movable for adjustment but the other end of the lever is movable by the pressure responsive device 16 through lever 18 and stem 17.

The foregoing sets forth the essential part of the invention which is concerned with maintaining the particular law connecting fuel supply with the two controlling pressures.

Referring now to the illustration of the complete system in Figs. 1a and 1b, the centrifugal fuel pump 57 is shown in Fig. 1a as driven by an air operated turbine 58. To prevent it from running away on a very great decrease of load on the pump 57, the turbine 58 is throttled in response to excessive pump pressure; control valve piston 59, which is movable in the cylinder 60 under the pressure of liquid directly from the outlet of the pump 57 through the branch pipe 4b against the pressure of liquid through the branch pipe 5a from the outlet from the pressure regulator 1 and the force of a biassing spring 61 adjustable by the screwed abutment 62, can admit pressure liquid from pipe 4b to the face of a piston 63 movable against the pressure of spring 64 to act through the linkage 65 to close a throttle 66, preferably located in the outlet from the air turbine 58. The piston 63 has a small and possibly adjustable orifice 63a through which the pressure liquid can leak away to the pump inlet through the pipe 68a and so back to the fuel reservoir to allow the throttle 66 to re-open slowly when the control valve piston 59 has moved back to the closed position. This device thus tends also to maintain a fairly steady pressure drop across the pressure regulator 1 and so reduces the required operating range of this regulator. The fuel goes from the reservoir 67 by the pipe 68 to the inlet to the pump and thence out from the pump outlet by the pipe 4 to the pressure regulator 1. The working pressure of the output from the pump is, of course, a pressure greater than the sum of all the losses in the system.

The pressure regulator 1 and the regulator controller 6 are as described already with reference to Fig. 2, except that the latter actuates the former through a servo device controlled by a valve actuated by the diaphragm 7; the arrangement is such that when the diaphragm is in equilibrium it is always in its datum position. The variable throttle valve 2 is formed at 2a as a piston slidable in a part of the regulator serving as a cylinder to which pressure fluid can be admitted to act on either side of the piston while the other side of the piston is connected to exhaust. A spring 26 normally tends to keep the throttle valve 2 fully open. The diaphragm 7 acts through its stem 7a and through lever 29 pivoted at 30 on a piston valve 28 slidable in the valve body 27 to close ports connected to the spaces above and below the piston 2a through pipes 31 and 32 respectively or to connect one or other of these ports to pressure and the other to exhaust. Thus on a rise of pressure across the orifice 10b, the diaphragm 7 can temporarily displace valve 28 to set the servo piston 2a in motion to close partially the throttle valve 2 and reduce the pressure in the pipe 5 going to the upstream side of the orifice 10b; this continues until the difference between the two pressures on opposite sides of the diaphragm 7 is again balanced by the force of spring 8 and the diaphragm is restored to its position of equilibrium. The abutment 7b on the diaphragm, against which spring 8 bears, is then also returned to the correct datum position for the end of the spring.

The fuel circuit can be traced in Fig. 1a from the reservoir 67 through the pipe 68, the pump 57, the pipe 4, the variable throttle 2 and the pipe 5 and in Fig. 1b from pipe 5 through the starting device 76 to be described later and thence by the pipes 5b and 5c to the interior of the casings of a metering device 10 and of a second and similar metering device 75. The interior of the metering device 10 is connected through the pipes 5e and 90 of Fig. 1b and pipe 90 of Fig. 1a to one side of the diaphragm 7 of the controller 6.

The metering device 10 (Fig. 1b) is as already described with reference to Fig. 2 except that the width of the gap between the members 11 and 12 can be varied by moving one of these members by adjusting screw 33 to alter the gap along the casing between them and thereby to adjust the constant A.

The slidable orifice member 13 has its stem 17 moved by the pressure gauge 15, 16 through the servo device 34. The latter includes a piston valve 35 movable by the pressure gauge 15 and 16 through the lever 18 and a piston 36 directly connected to the stem 17. The piston valve 35 is slidable partly in the cylinder body of the servo device 34 and partly within the servo piston 36; this location of the control valve within the servo motor itself saves space. Movement of the valve 35 in one direction or the other will change the relative positions of this valve and of piston 36 and so admit pressure fluid to the space on one side of piston 36 while connecting the space on the other side to exhaust; accordingly the piston 36 will tend to move (moving with it the stem 17) until the piston 36 is back into normal relationship with the valve 35.

To adjust the pressure of spring 8 in the pressure regulator 6 (Fig. 1a) the pressure responsive device 21 can move the abutment 20 through another servo device. This device 21 is shown in Fig. 1a as consisting of a diaphragm 38 within the casing of the device 21, a stem 39 movable by said diaphragm and a lever 40 pivotably movable about pivot 41 by means of the stem 39. The pressures $P_1$ and $P_2$ are applied on opposite sides of the diaphragm 38. The lever 40 can actuate the piston valve 42 to apply fluid pressure to one side of the piston 46 of the servo device 47 of which the piston rod 46a can move one end of the lever 22 of which the other end, as already described, can move the abutment 20 for the spring 8. The extent to which this servo device can bring about increase of the biasing force exerted on the diaphragm by the spring 8 and consequent increase of the fuel supply is limited by the adjustable screwed stop 48 limiting the travel of the servomotor piston 46.

A compression spring 43 is connected between the end of the piston rod 46a and an end 42a of the piston valve 42. Undue movement of the diaphragm 38 of the device 21 is limited by the adjustable screw stop 74. The reason for making the device 21 actuated differentially by $P_1$ and $P_2$ is because it allows of the use of a diaphragm type device. The device 21 alone tends to vary the force of spring 8 proportionally to $P_2-P_1$. If the device 16 acting through the described linkage tends to vary the force as $KP_1$ then the force will vary proportionally to $P_2-P_1-KP_1$ or $P_2-CP_1$ where C is equal to $1+K$.

As already described with reference to Fig. 2, the abutment 20 is also movable by lever 22, slider 23, and the left-hand end of lever 24, shown in Fig. 1a, and the right-hand end of lever 24 and the stem 17 (Fig. 1b). The adjustably movable fulcrum 25 (Fig. 1a) pivotally carries the member 49 which is slidable along the lever 24 and these members can be moved by means of the adjusting nut 50 to vary the constant K and thus also the constant C.

The use of hydraulic servo devices allows the diaphragms or pressure capsules of the various pressure-responsive and differential devices to actuate only control valves. The liquid fuel is conveniently used as serving as the servo liquid. For this purpose fluid under pressure from the pump outlet upstream of regulator 1 in Fig. 1a is supplied by branch pipe 4a from the pump outlet to the servo devices 27, 34 and 42 which are also connected by the return pipe 67a to the pump inlet and to the fuel reservoir 67.

When a speed of flight corresponding to a particular Mach number is reached further acceleration of the vehicle is prevented by means which reduce the fuel supply to the burners, or to some of them, on increase of the Mach number beyond a given value. These means can consist of a Mach number controller of a kind indicated at 51 in Fig. 1b dependent upon the relationship of the static ambient pressure $R_1$ to the Rayleigh-Pitot pressure $P_2$. This device, which is not described in detail because it can be of the kind which is the subject of the separate and copending U. S. patent application Serial No. 272,481, now abandoned, actuates a control valve 52 for a servo device 53 which exerts a control on the orifice devices 10 and 75 by moving the movable orifice members 13 by means of piston 54, the stroke of which is limited by the screwed stop 56. Up to a given altitude this controller 51 is rendered inoperative by an exhaust to atmosphere. A supply which leaks through restriction 72 can, in operation, build up underneath the diaphragm of device 51, through pipe 72a, a pressure equal to $P_2$. But while the pressure $P_1$ is above a certain adjustable value there is a leakage to atmosphere through pipe 72b, ports in a valve casing 70, and exhaust pipe 73. When the pressure $P_1$ falls below this value, an adjustable screwed tappet 37 moved by the stem 17 actuated by the servo device 34 controlled by the pressure responsive device 16 can engage the stem 69a of a valve 69 to move this valve in casing 70 against a biassing spring 71 until it admits liquid under pressure from pipe 4a to complete the movement of this valve and hold it in a position shutting the exhaust to atmosphere from pipe 72b; pressure can build up to $P_2$ below the diaphragm in device 51, thus bringing this device into operation.

The pressure $P_2$ can be measured in the usual way by a tube forwardly facing in the direction of flight, as indicated at 100 in Fig. 1b and connected to the various devices (21 and 51) by pipe 101; the static ambient pressure $P_1$ can be measured in the usual way through an opening shielded from the pressure due to flight, such as a tube directed perpendicularly across the direction of flight as indicated at 102 and connected to the various devices (16, 21 and 51) through pipe 103.

The orifice device 10 can supply main burners and the device 75 can supply auxiliary burners for supplying additional force such as for acceleration. The pressure responsive device 16 acts on both devices 10 and 75 through member 55 whereas the Mach number controller 51 controls only the device 75. It will be understood that member 55 could alternatively be an arm tying the movable orifice members of devices 10 and 75 to move rigidly together and member 11 of devices 10 and 75 or of any one of them such as 75 could then be movable (to vary the gap 10a) and linked to the piston 54.

The rates of flow through the separate metering orifices of devices 10 and 75 will of course differ, apart from any action of device 51, and the rates can be separately adjusted by their adjusting screws 33. The fuel coming from pipe 5 will divide in any desired ratio through branch pipes 5b and 5c to the separate metering devices yet all are under the control of pressure regulator 1 controlled by the pressure across the orifice of device 10.

During launching, the arrangement so far described would admit no fuel to the burners and so the power plant would be delayed in starting up. An overriding control arrangement is provided to control the fuel supply during launching and so control the starting-up of the power plant. This comprises the time-delay valve device 76 and the throw-over device 87 shown at the bottom of Fig. 1b and the auxiliary loading device 82 shown in Fig. 1a below device 6.

Fuel on its way to the metering device 10 from pipe 5 in Fig. 1b passes through the variable orifice of the delay valve device 76, consisting of two cylinders in line; hollow trunk piston 77 loaded by spring 78 is movable in one cylinder and a piston valve 79 loaded by spring 80 is movable in the other. The fuel pipe 5 is connected to a port 76a leading to the interior of the trunk piston 77. The latter has a specially-shaped metering orifice 77a co-operating with port 76b in the cylinder, which is connected by branch pipes 5b and 5c to the metering devices 10 and 75. Piston 77 also has a calibrated leak orifice 77b opening into the cylinder. The auxiliary loading device 82 (Fig. 1a) consisting of a cylinder contains a piston 83 movable by spring 84 which can act, through push-rod 85, on the abutment 20 for spring 8 of the regulator controller 6 and so apply to diaphragm 7 a constant minimum biassing force determined by the adjustable screw stop 86. Piston 83 can be moved against the force of spring 84 by fluid pressure from pipe 81 of which the end shown in Fig. 1b can be connected by piston valve 79 of delay valve device 76 to pipe 4a.

Branch 81a from pipe 81 in Fig. 1b is connected to the throw-over valve device 87 wherein piston 88 is urged by spring 89 to a position in which it connects pipe 90 (going to regulator controller 6 of Fig. 1a to apply pressure to one side of diaphragm 7) to pipe 5b branched from the upstream side of the delay valve device 76. Pressure from pipe 81a—under control of piston valve 79—can move piston 88 of throw-over device 87 to a position in which it connects pipe 90 to pipe 5e branched from the inlet to the metering device 10.

The metering aperture 77a in the trunk piston 77 of device 76 consists of a portion of full width—i. e. such that allows almost unrestricted fuel flow—from which leads a narrow portion tapering outwards along the piston to full width. A tappet portion 79a between the trunk piston 77 and the piston valve 79 can be engaged just before piston 77 is in its one extreme end position whereby the piston 77 can move the piston valve 79 against spring 80.

Each fuel pipe 14 from a metering device 10 or 75 goes by way of a non-return valve 91 to a distributor 92 and thence to pipes 95 for connection to a number of separate burners. The distributor 92 includes a piston valve 93 urged by a spring 94 to cover a ring of ports to which are connected the pipes 95. Thus the incoming fuel bears against the front of the piston 93 to move it— against the force of the spring 94 and of combustionchamber pressure or of pressure $P_2$ applied through inlet 92a and acting on the back of the piston—to uncover the ports progressively. Piston 96 urged by spring 97 can also act through push rod 98 on the distributor valve 93 to keep it open, or partly open to an extent determined by an adjustable stop 99.

The parts are shown in Figs. 1a and 1b in the condition of free flight of the aircraft. The pump 57 (Fig. 1a) is producing full fuel pressure and the piston 77 of delay valve device 76 (Fig. 1b) is held by the fuel pressure in its extreme right-hand position against the force of spring 78 so that valve 79 is held open against the force of spring 80. The fuel circuit can be traced from the reservoir 67 in Fig. 1a through pipe 68 and pump 57 to pipe 4. Branch pipe 4b goes to device 60 for the purpose of controlling the throttle valve 66 as already explained. Branch pipe 4a, which can be traced from pipe 4 down to the bottom right-hand corner of Fig. 1a and thence to pipe 4a of Fig. 1b, goes to device 76 and is connected through the piston valve 79 firstly to pipe 81, going to loading device 82, and secondly to pipes 4c going to the distributors so that pressure acting on pistons 83 and 96 will hold these devices out of action. Branch pipe 81a goes to throw-over device 87 so that the pressure holds piston valve 88 in the position to connect pipe 90 to pipe 5e. The main fuel circuit continues from pipe 4 of Fig. 1a through the pressure regulator 1 and pipe 5 of Fig. 1a to pipe 5 of Fig. 1b, thence to device 76 and the orifice 77a. In this position of piston 77 the size of the orifice is equivalent to a fully-open valve so that the metering of the fuel is done solely by metering orifice 10b.

The action is as follows:

The fuel flows from pipe 4 in Fig. 1a to pipe 5 through the regulating throttle valve 2 of regulator 1 which accordingly determines the pressure in pipe 5; thence in Fig. 1b the fuel flows freely through device 76 and by pipes 5b, 5c, etc. to the metering devices 10, 75 etc. and so through orifices such as 10b to pipes 14, distributors 92 and burner-supply pipes 95. The rate of flow of fuel is proportional to the area of orifice 10b and to the square root of the difference of pressure $p$ across the orifice. By the connection of the pipe 5b by pipes 5e and 90 of Fig. 1b and pipe 90 of Fig. 1a to the regulator controller 6 the pressure upstream of the metering orifice 10b (Fig. 1b) is applied to one side of the diaphragm 7 in device 6 in Fig. 1a; by the connection of the downstream side of the orifice through pipe 9 to the regulator controller 6 the pressure there is applied to the other side of the diaphragm 7. This difference of pressure is $p$; the diaphragm will be in equilibrium only when $p$ produces a force on the diaphragm 7 equal to the force of spring 8 and so the regulator will tend to keep $p$ at a value determined by the spring 8. Thus on a rise of pressure across the metering orifice 10b the increase in $p$ will cause diaphragm 7 to move the valve 23 upwards to cause fluid pressure from pipes 4 and 4a to be applied through pipe 31 to the top of the servo piston 2a to close the throttle valve 2 and reduce the pressure in pipe 5 until the difference in pressure $p$ is again balanced by the spring 8.

The area of orifice 10b in Fib. 1b is varied by the pressure responsive device 16 in accordance with the static ambient pressure $P_1$. Thus on an increase in $P_1$ the capsule 15 will move valve 35 up to admit fluid pressure below the piston 36 until that has moved up correspondingly. This will move stem 17 and orifice member 13 to increase correspondingly the length of metering orifice 10b. Thus this length will vary as a function of $P_1$ dependent on the shape of opening 13a. The area of orifice 10b will then be $Af(P_1)$ where A is determined by the width of orifice 10b which can be adjusted by screw 33.

Hence the rate of fuel flow will be $Af(P_1)\sqrt{p}$.

The value of $p$ is jointly controlled by device 21 (Fig. 1a) and device 16 (Fig. 1b). Thus on an increase of the pressure $P_2$ the diaphragm 38 in device 21 will raise piston valve 42 against the force of spring 43 and apply fluid pressure above piston 46 to move the latter until the force of spring 43 recloses valve 42 and restores the diaphragm 7 in device 6 to equilibrium. The piston 46 through lever 22 will raise the abutment 20 to increase the force of spring 8 to correspond to the increase in $P_2$. But any increase in $P_1$ will cause movement upward of stem 17 in Fig. 1b to move lever 24 to lower the link 23 in Fig. 1a and tend to decrease the force of spring 8 in device 6 in accordance with the increase in $CP_1$ where C is a constant adjusted by moving the fulcrum 25. Thus the spring pressure and $p$ will be regulated to a value proportional to $(P_2-CP_1)$; the flow of fuel will be proportional to the square root of this and so the flow will be $Af(P_1)\sqrt{P_2-CP_1}$.

Before launching of the aircraft begins, the trunk piston 77 in device 76 (Fig. 1b) is kept in its left-hand extreme position by spring 78, with orifice 77a at full width and valve 79 is kept closed by spring 80. The pressure regulator throttle valve 2 of regulator 1 (Fig. 1a) is kept fully open by spring 26. When pump 57 shown in Fig. 1a, driven by turbine 58, starts up and fuel commences to flow, with valve 2 fully open and orifice 77a at full width, and with the distributor valves 93 held fully open by springs 97, fuel can commence to flow freely to fill up the control equipment and its connecting pipes. Fuel leaking through the leak hole 77b slowly builds up pressure which moves the piston 77 against spring 78 to bring then arrow part of orifice 77a opposite the port 76b and restrict the fuel supply. Continued movemet of piston 77 will increase the fuel supply progressively in a manner determined partly by the shape of the orifice 77a and partly by the pressure maintained. Because spring 89 is holding piston valve 88 in throw-over device 87 in position to connect pipe 90 to pipe 5d the regulator controller 6 of Fig. 1a is connected across the two metering orifices 77a and 10b (Fig. 1b) in series, and because spring 84 of auxiliary loading device 82 applies a minimum load to spring 8 and diaphragm 7 of device 6, the pressure across the two orifices in series will be maintained at this minimum value. Until the aircraft gains height and $P_1$ decreases, the action of pressure responsive device 16 (Fig. 1b) will hold orifice member 13 in device 10 in the position of maximum opening of orifice. Thus during launching the fuel will be controlled according to a law different from that holding during normal flight and independently of $P_1$ and $P_2$ unless and until, during launching, the pressure $P_2$ reaches such a value that the quantity of $(P_2-CP_1)$ is of such value as to apply to spring 8 of the regulator controller 6 a load greater than the minimum applied by spring 84 of the auxiliary loading spring device 83. The trunk piston 77 of device 76 in Fig. 1b will move at such a rate that ignition of the burners—e. g. from an igniter or from auxiliary burners ignited before the launch—will take place and combustion be maintained before the piston 77 reaches the end of its stroke. At the end, orifice 77a is full open, and valve 79 is moved to apply fluid pressure to pistons 83, 88 and 96 to move them to their normal positions for operation during free flight as already described. Although the pressure drop across orifice 77a will no wbe very small, it may be an appreciable pressure relatively to that across the metering orifice 10b; any error that would be due to this if the controller 6 were left across the two orifices in series is eliminated by the action of throw-over device 87.

What we claim is:

1. In a combustion control system for a thermal power plant for jet propulsion of aircraft, means for supplying liquid fuel to said plant, and means responsive jointly to static ambient atmospheric pressure $P_1$ and to a pressure $P_2$ dependent on the speed of flight for operating said fuel supplying means so as to control the rate of supply of fuel to said plant according to the law:

$$Af(P_1)\sqrt{P_2 - CP_1}$$

where $f(P_1)$ is some desired function of $P_1$ and A and C are constants.

2. A fuel control system for a thermal power plant for jet propulsion of aircraft, comprising a device responsive to the static ambient atmospheric pressure $B_1$, a device responsive to an air pressure $P_2$ dependent on the speed of flight, a source of supply of liquid fuel under pressure, a burner, means defining a path for liquid fuel from said source to said burner, means defining a variable metering orifice located in said path and controlled only by the first said pressure responsive device, a pressure-regulator in the fuel path between the said source of supply and the said metering orifice, and means under the joint and differential control of both said pressure responsive devices for moving said pressure regulator in a corrective sense in response to any deviation of the liquid pressure across said orifice from a determined pressure proportional to $(B_2 - CP_1)$ where C is a constant.

3. A control system according to claim 2 wherein said means comprise firstly of a regulator controller acted upon differentially by the liquid pressure across said orifice and by a biassing force variable under the joint control of the two pressure responsive devices, and secondly of motive means for moving said pressure regulator in response to any out-of-balance of said regulator controller.

4. A control system according to claim 2 wherein said means comprises a regulator controller an out-of-balance device therein in the form of a diaphragm exposed on opposite sides to the liquid pressures on opposite sides of the said metering orifice, a spring acting on the diaphragm in a sense to assist the lower of the two said liquid pressures acting on the diaphragm, means for varying the force of said spring under the differential control of the said two pressure gauges and motive means for moving said pressure regulator in response to any out-of-balance condition of said diaphragm.

5. A control system according to claim 4 wherein the said means for varying the force of said spring comprise a movable abutment for said spring, a linkage connecting said abutment to said two pressure responsive devices in a sense to move the abutment in the direction for increasing the spring force on an increase in the pressure $P_2$ and in the opposite direction on an increase in the pressure $P_1$, and an adjusting element in said linkage for varying the movement brought about by a given change in pressure $P_1$, for the purpose of adjusting the constant C.

6. A fuel control system for a thermal power plant for jet propulsion of aircraft comprising a source of supply of liquid fuel under pressure, means defining a plurality of variable metering orifices in separate branches of the path for fuel from said source, said orifices being independently adjustable, means for varying said orifices jointly in accordance with static ambient atmospheric pressure and means for varying the pressure of the liquid fuel supplied to said orifices in response to any deviation of the liquid pressure across one of the orifices from a chosen value and in a sense to correct said deviation.

7. A fuel control system for a thermal power plant for jet propulsion of aircraft including means for controlling the supply of liquid fuel, during flight, in joint dependence on the static ambient atmospheric pressure and on an air pressure dependent on the speed of flight, in combination with time-delay means for over-riding the said control of fuel supply temporarily during initial flight.

8. A fuel control system for a thermal power plant for jet propulsion of aircraft including a source of supply of liquid fuel under pressure, a burner, means defining a path for liquid fuel from said source to said burner, means defining a variable metering orifice in said path, means dependent on both the static ambient atmospheric pressure ($P_1$) and an air pressure ($P_2$) which depends on the speed of flight, for controlling, during flight, both the area of said metering orifice and the liquid pressure across the orific, means defining a second metering orifice in the fuel path in series with the first orifice, starting control means operative during initial flight for maintaining a pre-determined minimum liquid pressure across a part of the fuel path including at least said second metering orifice and a time-delay device for putting the said starting control means out of action, leaving the fuel under the control in accordance with $P_1$ and $P_2$.

9. A fuel control system for a thermal power plant for jet propulsion of aircraft comprising a source of supply of liquid fuel under pressure, a variable metering orifice in the path of liquid fuel from said source, means for varying said orifice in accordance with the static ambient atmospheric pressure, a regulator controller having a diaphragm subjected to the liquid pressure across said orifice, means for applying to said diaphragm a biasing force dependent jointly on said ambient pressure and on a pressure dependent on the speed of flight, a pressure regulator for varying the pressure of liquid supplied to said orifice, in a corrective sense, in response to any out-of-balance of said diaphragm, a second metering orifice in series with the first, an auxiliary loading device connected to said diaphragm in a sense to increase the biasing force thereon to a predetermined minimum during initial flight, a throw-over valve initially connecting the regulator controller to the second metering orifice, the diaphragm thus being initially subjected to the pressure across the two metering orifices in series, and a time-delay device operable after a given time to put the auxiliary loading device out of action and to move the throw-over valve to a position in which it connects the regulator controller to the first metering orifice alone, the diaphragm being thus thereafter exposed to the pressure across only the first metering device.

10. A control system according to claim 9 wherein the second metering orifice is variable in response to building-up of fuel pressure.

11. A control system according to claim 10 wherein the time-delay device comprises a cylinder, a piston moveable therein and apertured to constitute the said second variable metering orifice, a spring urging the piston to an initial position in the cylinder, a connection from the source of fuel supply to the cylinder through a restricted opening, exposing the piston to pressure urging the piston, against the force of the spring towards a second position and a moveable member engaged by the piston as it comes to its second position, this latter member constituting the part of the time-delay device which actuates the auxiliary loading device and the throw-over valve.

12. A fuel control system for a thermal power plant for jet propulsion of aircraft including means for controlling the supply of liquid fuel, during flight, in joint dependence firstly on the static ambient atmospheric pressure, secondly on an air pressure dependent on the speed of flight and thirdly on the ratio of the speed of flight to the speed of sound in the ambient atmosphere (i. e. the Mach number), and means for delaying the effectiveness of the latter control, i. e. the control in dependence on Mach number during initial flight until the aircraft has first reached a given altitude.

13. A fuel control system for a thermal power plant for jet propulsion of aircraft comprising a source of supply of liquid fuel under pressure, a plurality of variable metering orifices in separate branches of the path for fuel from said source, said orifices being independently adjustable, means for varying said orifices jointly in accordance with static ambient atmospheric pressure, means for varying the pressure of the liquid fuel supplied to said orifices in response to any deviation of the liquid pressure across at least one of them from a value which is a predetermined joint function of the said ambient pressure and of a pressure dependent on the speed of flight, and means for varying the area of one of said metering orifices relatively to the other in dependence on the ratio of the speed of flight to the speed of sound in the ambient atmosphere.

14. In a combustion control system for a thermal power plant for jet propulsion of aircraft, a first means responsive to a function $f(P_1)$ of the static ambient atmospheric pressure $P_1$, a second means responsive to $\sqrt{P_2-CP_1}$, where $P_2$ is a pressure dependent on the speed of flight, and C is a constant, and means for determining the rate of supply of liquid fuel to the plant under the combined control of the first said means and the second said means.

References Cited in the file of this patent

UNITED STATES PATENTS

| | | |
|---|---|---|
| 2,450,535 | Watson et al. | Oct. 5, 1948 |
| 2,479,813 | Chamberlin et al. | Aug. 23, 1949 |
| 2,503,048 | Ifield | Apr. 4, 1950 |
| 2,524,444 | Ifield | Oct. 3, 1950 |
| 2,566,319 | Deacon | Sept. 4, 1951 |
| 2,581,275 | Mock | Jan. 1, 1952 |
| 2,604,149 | Wynne | July 22, 1952 |
| 2,642,237 | Page et al. | June 16, 1953 |
| 2,654,995 | Ostroff | Oct. 13, 1953 |
| 2,706,885 | Ostroff et al. | Apr. 26, 1955 |

FOREIGN PATENTS

| | | |
|---|---|---|
| 614,341 | Great Britain | Dec. 14, 1948 |